United States Patent [19]
Frische et al.

[11] Patent Number: 4,479,070
[45] Date of Patent: Oct. 23, 1984

[54] VIBRATING QUARTZ DIAPHRAGM PRESSURE SENSOR

[75] Inventors: Richard H. Frische; Rudolf C. Dankwort; Charles D. Klem, all of Phoenix, Ariz.

[73] Assignee: Sperry Corporation, New York, N.Y.

[21] Appl. No.: 503,004

[22] Filed: Jun. 10, 1983

[51] Int. Cl.³ .......................................... H01L 41/08
[52] U.S. Cl. ................................. 310/338; 310/346; 73/861.47; 73/703
[58] Field of Search .............. 310/338, 339, 330, 331, 310/346, 340, 344, 369; 73/23, 29, 30, 73, 702, 703, 708, 715, 717, 716, 763, 766, 774, 777, 778, 861.01, 861.18, 861.42, 861.44, 861.45, 861.47, DIG. 4

[56] References Cited
U.S. PATENT DOCUMENTS 3,561,832  2/1971  Karrer et al. ...................... 310/338
3,617,780 11/1971  Benjaminson .................. 310/346 X
3,978,731  9/1976  Reeder et al. ................ 310/338 UX
4,166,967  9/1979  Benes et al. ........................ 310/338
4,216,401  8/1980  Wagner ........................... 310/338 X
4,317,372  3/1982  Hartemann ................. 73/DIG. 4 X
4,361,050 11/1982  Coussot et al. ................... 73/861.47

Primary Examiner—Mark O. Budd
Attorney, Agent, or Firm—Howard P. Terry

[57] ABSTRACT

A quartz crystal vibrating diaphragm pressure sensor includes a primary quartz crystal body having a diaphragm formed therein and electrodes on each side of the diaphragm for piezoelectrically exciting thickness shear mode oscillations of said diaphragm, said oscillations varying in frequency in accordance with variations in fluid pressures applied to the surfaces of said diaphragm. A second identical or substantially identical diaphragm similarly excited but exposed to a constant pressure provides a reference frequency for providing precision difference frequency pressure measurement and for inherently compensating for ambient conditions affecting both diaphragms.

24 Claims, 5 Drawing Figures

VIBRATING QUARTZ DIAPHRAGM PRESSURE SENSOR

BACKGROUND OF THE INVENTION

1. Field of the Invention

This invention relates generally to pressure sensors and more particularly to a pressure sensor which is suitable to use in high precision digital air data computers for airborne measurement of altitude, airspeed, Mach number and related air vehicle parameters.

2. Description of the Prior Art

Present commercial and military aircraft require very precise measurement of pitot and static pressure for accurately determining airspeed, altitude, Mach number and related aerodynamic parameters. Most new aircraft utilize dedicated digital air data computers which include precision pressure sensors, a digital processor for computing required air data functions and output circuits for interfacing with other aircraft systems including cockpit displays. The pressure sensors for these computers are required to have a very high level of precision and resolution which exceeds the performance of state-of-the-art analog-to-digital converters. The sensors, therefore, must provide an output frequency or time period as a function of pressure which is compatible with providing a 20 to 24 bit digital input to the processor which is updated a minimum of 16 times per second. These sensors are required to maintain calibration for very long periods of time and to provide accurate performance in the normal environment of airborne electronic equipment. Calibration and thermal compensation are usually accomplished in the digital processor using coefficients which are stored in digital memory circuits packaged with the sensor.

There are a number of sensor configurations which meet the requirements for current aircraft applications. U.S. Pat. No. 3,456,508, also assigned to the present assignee, describes one such sensor which has been widely used in military, commercial, and general aviation systems. These devices typically require a high degree of manufacturing expertise and represent a significant portion of the cost, size and weight of modern digital air data computers. These sensors usually require complex calibration over a wide band of pressure and temperature to insure accuracy.

There is a continuing trend in reduction of both size and cost of digital electronics. There is also a trend toward combining air data functions with other computations as more powerful digital computer devices become available. These trends have made it increasingly important to develop a pressure sensor with required accuracy but with reduced size, weight and production cost. It is also desirable to reduce the calibration complexity and amount of computer time required for such sensor calibration.

The vibrating diaphragm pressure sensor described in U.S. Pat. No. 3,456,508 referenced above is one of the best pressure sensors presently available for air data applications. It uses the variation in natural frequency of a simple metal diaphragm as a function of applied pressure loading. The output frequency is related only to diaphragm characteristics and applied pressure load. Characteristics of the diaphragm drive electronics and frequency-to-digital conversion electronics do not have any significant effect on the sensor output accuracy. This sensor and other similar vibrating sensors must be mounted in a manner which isolates the sensor element from its surroundings at all frequencies within its operating range. There are also acoustic waves within the sensor cavity or attached tubing which contribute to thermal sensitivity and prevent these very accurate devices from being utilized for measuring differential pressure since acoustic forces on the vibrating element are a function of gas density.

The quartz diaphragm sensor of this invention is significantly smaller than present state-of-the-art air data pressure sensor devices. It provides a means for using the extremely stable mechanical properties and the piezoelectric properties of crystalline quartz to achieve a very stable, miniature, low cost pressure sensor. The variation of a piezoelectrically induced thickness mode oscillation in a cyrstalline quartz diaphragm as a function of pressure loading is used with suitable electronic circuits to provide a digital output. The use of a crystalline quartz diaphragm provides the extremely stable mechanical properties required for accuracy and calibration stability without the special heat treatment and material controls required for metal diaphragm sensors. Crystalline quartz is also more stable than fused quartz which is used in some state-of-the-art devices. The piezoelectric properties of crystalline quartz provide a simple means for exciting a thickness shear mode oscillation which does not have any measurable acoustic effects in the sensor cavity. This oscillation is completely isolated within the diaphragm itself and does not propagate to the sensor mounting. As with the vibrating diaphragm pressure sensor cited above, there are no mechanical linkages or electric circuits which contribute to errors or variations in the output frequency as a function of pressure. A reference oscillation on the same piece of quartz has been included to provide a difference frequency suitable for digital conversion and simultaneously provide compensations for variations in the output frequency as a function of temperature.

The sensor of this invention is simple in structure and suitable for manufacture using automated, multiple unit processes such as are used in the production of crystal oscillators for wrist watches and other applications requiring an accurate frequency reference with long term stability. As such it has lower production costs and lends itself to high volume production. It is also useable for many applications where cost and/or size have prevented use of a sensor of this accuracy class.

SUMMARY OF THE INVENTION

This patent describes a solid state pressure sensor, which uses the extremely stable mechanical and piezoelectric properties of crystalline quartz to produce a highly accurate output, and which is directly applicable to digital system usage without necessity of further analog-to-digital converter devices and accuracy degradation associated with them. The pressure to be measured can be either absolute (vacuum reference) or differential. The pressure applies stress to a first diaphragm shaped crystal resonator which changes the oscillator natural frequency in a relatively linear manner as a function of applied pressure. This pressure varied frequency is subtracted from the frequency established by a second similar but unstressed crystal resonator to obtain a difference frequency which can be directly related to applied pressure loading in the first crystal. This difference frequency is converted to a digital number by means of digital counters and a precision/high frequency clock signal.

DESCRIPTION OF THE PREFERRED EMBODIMENTS

Figure 1:
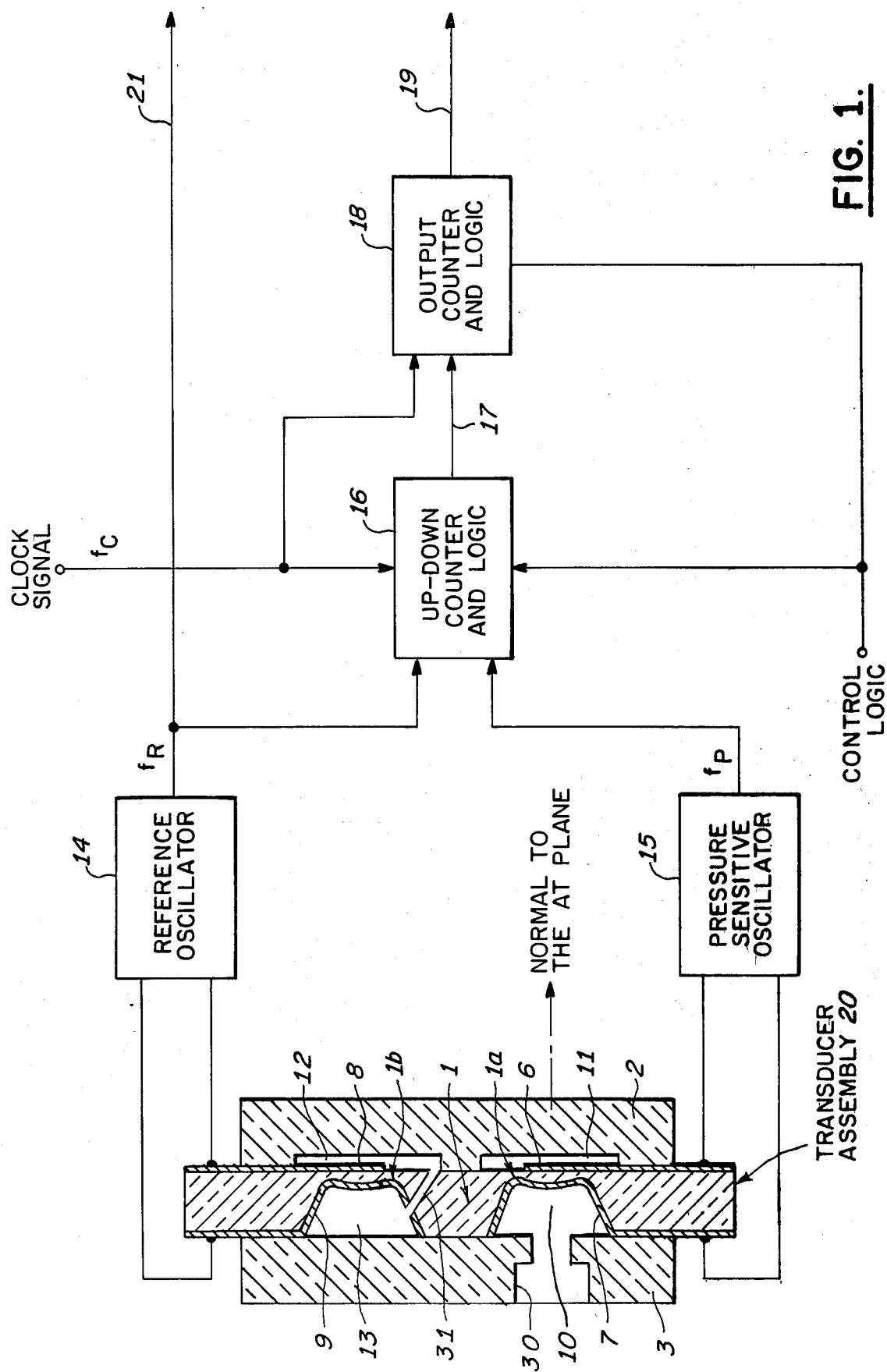
FIG. 1 is a section view of the quartz pressure transducer configured as an absolute measurement device together with a block diagram of the data conversion electronics.
Figure 2:
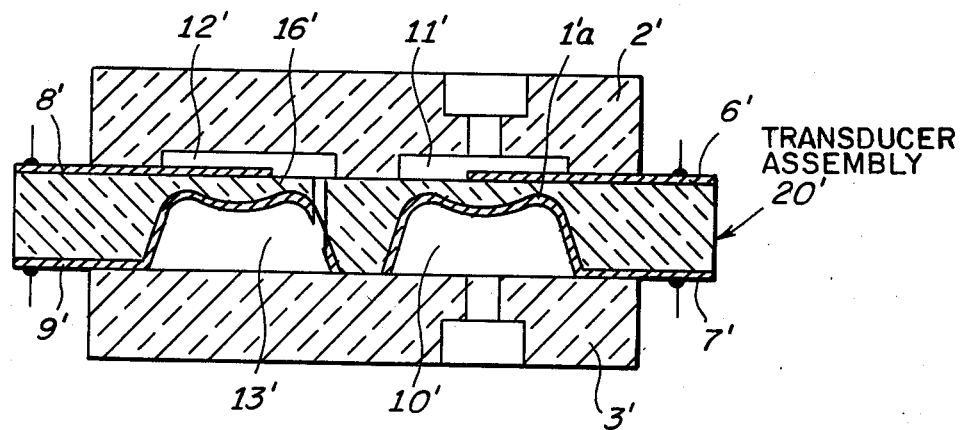
FIG. 2 is a section view of the quartz pressure transducer configured as a differential measurement device.

FIG. 1 presents a function diagram which shows the basic structure of the present sensor of the present embodiment. The transducer element 20 is configured for the measurement of absolute pressure and its operation will be herein described in those terms. A very simple and minor change in the transducer element structure 20', shown in FIG. 2, permits measurement of differential pressure.

The transducer element or assembly 20 contains two essentially identical crystal diaphragms 1a and 1b integrally formed within a common crystalline quartz diaphragm plate 1. One of the crystal diaphragms, 1a is subject to pressure loading. The pressure to be measured is applied to cavity 10 formed between the diaphragm plate 1 and a base plate 3 through an opening 30 in the base 3. A reference vacuum is established and maintained in a cavity 11 formed between cover plate 2 and the diaphragm plate 1. The cavities 10 and 13 which define the diaphragms 1a and 1b, respectively, in the quartz crystal 1, the cavities 11 and 12 in the quartz crystal cover 2 and the opening 30 in the quartz crystal base 3 are all formed using conventional machining techniques well known in the art.

Figure 5:
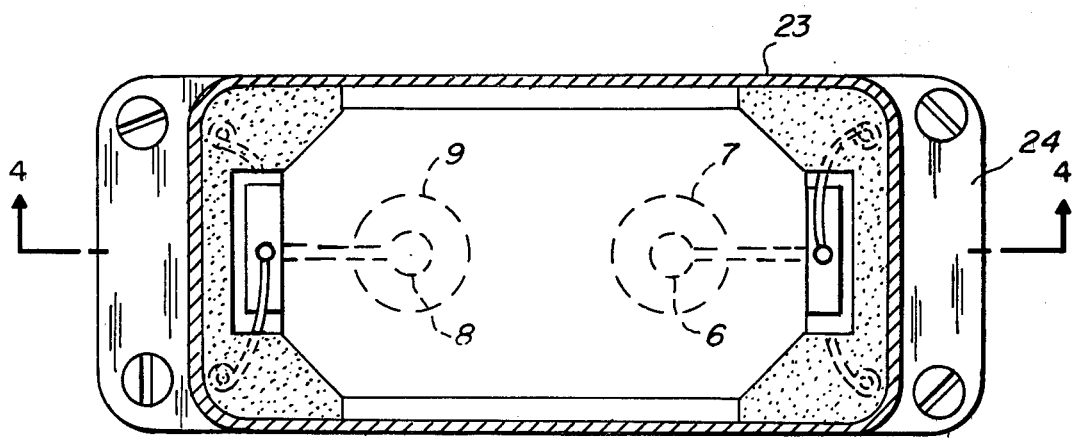
FIG. 5 is a lateral cross-sectional view of the assembly of FIG. 4 taken along section line 5—5 thereof.

The diaphragm plate 1, the cover plate 2, and the base plate 3 are each constructed from crystalline quartz of essentially identical crystal orientation and bonded together in a manner which maintains the crystal axis alignment, i.e., mutually parallel, between all three pieces. The pressure in cavity 10 and the vacuum in cavity 11 establish a pressure load across diaphragm 1a. Diaphragm 1b is subject to equalized pressures, preferably but not necessarily a vacuum in cavities 12 and 13 and is therefore free from pressure loading. Note the passage 31 interconnecting these cavities to assure such zero loading. Note also that the passage 31 is located so that it does not disturb the characteristics of the diaphragm 1b or its peripheral support to the plate 1. Thickness shear mode oscillations are piezoelectrically stimulated in the center area of both diaphragms by means of electrodes 6, 7, 8 and 9 and two oscillator circuits 14 and 15. As shown in FIGS. 1 and 5, the electrodes 7 and 9 cover th entire area of the cavities 10 and 13 and are connected via conductive strips to external tabs on the underside of an extension of plate 1. Electrodes 6 and 8 are relatively small circular electrodes at the centers of the diaphragms 1a and 1b, respectively, which electrodes are likewise connected via conductor strips to external tabs on the upper side of the extensions of plate 1. Thus, the small circular electrodes 6 and 8 acting with electrodes 7 and 9 excite thickness shear compression resonance in the central portion of the diaphragms 1a and 1b. All electrodes, connector strips and tabs are formed on the crystal surfaces using conventional masking and vapor deposition techniques. The oscillator circuits 14 and 15 stimulate and maintain the primary thickness shear mode frequencies $f_P$ and $f_R$ of the diaphragms 1a and 1b respectively independent of variations in circuit parameters.

It is well established that the frequency of thickness shear resonances of a quartz plate can be expressed simply as $$f = \frac{1}{2t} \sqrt{\frac{C_{66}}{\rho}}$$

where f is the resonant frequency, t is the plate thickness, $\rho$ is the density of quartz, and $C_{66}$ is an elastic coefficient for the particular orientation of the plate. It is also well known that if a force is applied at the periphery of the plate, the resonant frequency will change an amount that is dependent upon the orientation of the plate with respect to its crystallographic axes, the direction of application of the force within the plane of the plate, and the magnitude of that force. It is understood that the frequency change is brought about by the combined effect of two separate physical phenomena. The first is the effect of the static deformation caused by the applied force, resulting in changes in the thickness and density parameters. The second results from changes in the $C_{66}$ coefficient brought about by the non-linear elastic properties of the crystal material. In the present invention the diaphragms (thin crystal plates 1a and 1b are suspended within the circular confines of the thick rigid structure of the diaphragm plate 1. As pressure is applied to diaphragm 1a it deforms by bending and stretching within the confines of its rigid peripheral support. The stretching of the diaphragm results in the alteration of the geometric and elastic coefficients thus causing the resonant frequency $f_P$ to decrease as a function of the applied pressure. The second diaphragm 1b is not similarly stressed and therefore its resonant frequency $f_R$ does not change and so is used as an accurate reference in measuring changes in the pressure variant frequency $f_P$.

The difference between the two oscillator frequencies, $f_r - f_P$, is therefore a direct function of pressure applied across diaphragm 1a, with a relationship depending only on the characteristics of the two diaphragms. As shown in FIG. 1, an up-down counter and appropriate logic 16 is used to establish an output 17, having a pulse width or time period related to the inverse of the frequency difference $f_R - f_P$. A second high speed counter and appropriate logic 18 is used in conjunction with a stable crystal clock reference frequency $f_C$, to generate a counter register digital output 19, which is also proportional to the inverse of the frequency difference $(f_R - f_P)$. The clock frequency $f_C$ is significantly higher than the two oscillator frequencies and is also used with the up-down counter logic circuits to prevent any ambiguity in the up-down counter operation when $f_P$ and $f_R$ are close to being in phase with one another. Alternatively, the two frequencies $f_R$ and $f_P$ may be mixed and filtered, using well known circuit techniques, to achieve a signal with a frequency equal to the difference between $f_R$ and $f_P$. This difference frequency can readily be converted to a digital output proportional to the inverse of the difference frequency $f_R - f_P$ using conventional counting circuit techniques.

Acceleration forces applied to the transducer also act as distributed loads on the diaphragms 1a and 1b in much the same manner as the pneumatic pressure load. However, such acceleration forces are inherently experienced by both diaphragms 1a and 1b and hence will result in equal shifts in both $f_R$ and $f_P$. Since both diaphragms are identical or substantially identical in shape and crystal orientation, these shifts in frequency will be essentially equal and will be cancelled in the frequency difference data conversion described above. Similarly, temperature affects the geometric and elastic parameters of both diaphragms 1a and 1b. Again, the resultant variations in the frequencies $f_R$ and $f_P$ will be eliminated by the frequency difference electronics in the same manner. Thus, the air data sensor of the present invention provides outputs which are free of errors due to accelerations of the vehicle in which it is used and to ambient temperature changes experienced by the vehicle. This is a very substantial improvement over vibratory pressure sensors of the prior art which require extensive calibration and compensation to reduce these effects.

Temperature sensitivity of the pressure sensor is further reduced by selecting a crystal axis orientation for minimum variation of oscillator frequency with temperature. Particular orientations of crystals are well known in the industry for producing oscillators with minimal thermal sensitivity. If even further accuracy is required, any residual thermal sensitivity can be measured at output 21 and conventionally corrected as a function of $f_R$ by the same digital processor which receives and processes the output 19 of the transducer.

The diaphragms 1a and 1b are designed with a shape, thickness, and electrode configuration as illustrated which provides energy trapping of the primary thickness shear mode. This maximizes the resonant quality "Q" of the oscillator and constrains the vibration energy to the center portions of the diaphragm. This same diaphragm profile is compatible with the shape required to minimize stress peaks in the pressure loaded diaphragm. Thus, as shown, the diaphragms 1a and 1b are designed to have a thickened central portion adjacent electrodes 6 and 8, which thickness tapers to a relatively thin section before joining plate 1. While the diaphragms are flat on one side to simplify manufacture, it will be understood that both sides may taper from their thickened central portions in the direction of their peripheral junctions with the plate 1. Further, the diaphragm profiles may have other shapes consistent with the establishment of thickness shear mode oscillations thereof.

The output provided at 19 is proportional to the inverse of the frequency difference $f_R - f_P$. This output can be stated in equation form as:

$$\frac{K}{f_R - f_P} \quad \frac{K}{\Delta f_O + \Delta f_P} \quad \frac{K}{\Delta f}$$

where K is an arbitrary calibration constant, $\Delta f_O$ is the frequency difference $f_R - f_P$ with no pressure applied across diaphragm 1a and $\Delta f_P$ is that portion of the frequency difference $f_R - f_P$ which is caused by pressure loading. The variation of frequency with pressure loading, $\Delta f_P$, is essentially linear with pressure and therefore the output function $K/\Delta f$ is hyperbolic in character as shown in FIG. 3.

Figure 3:
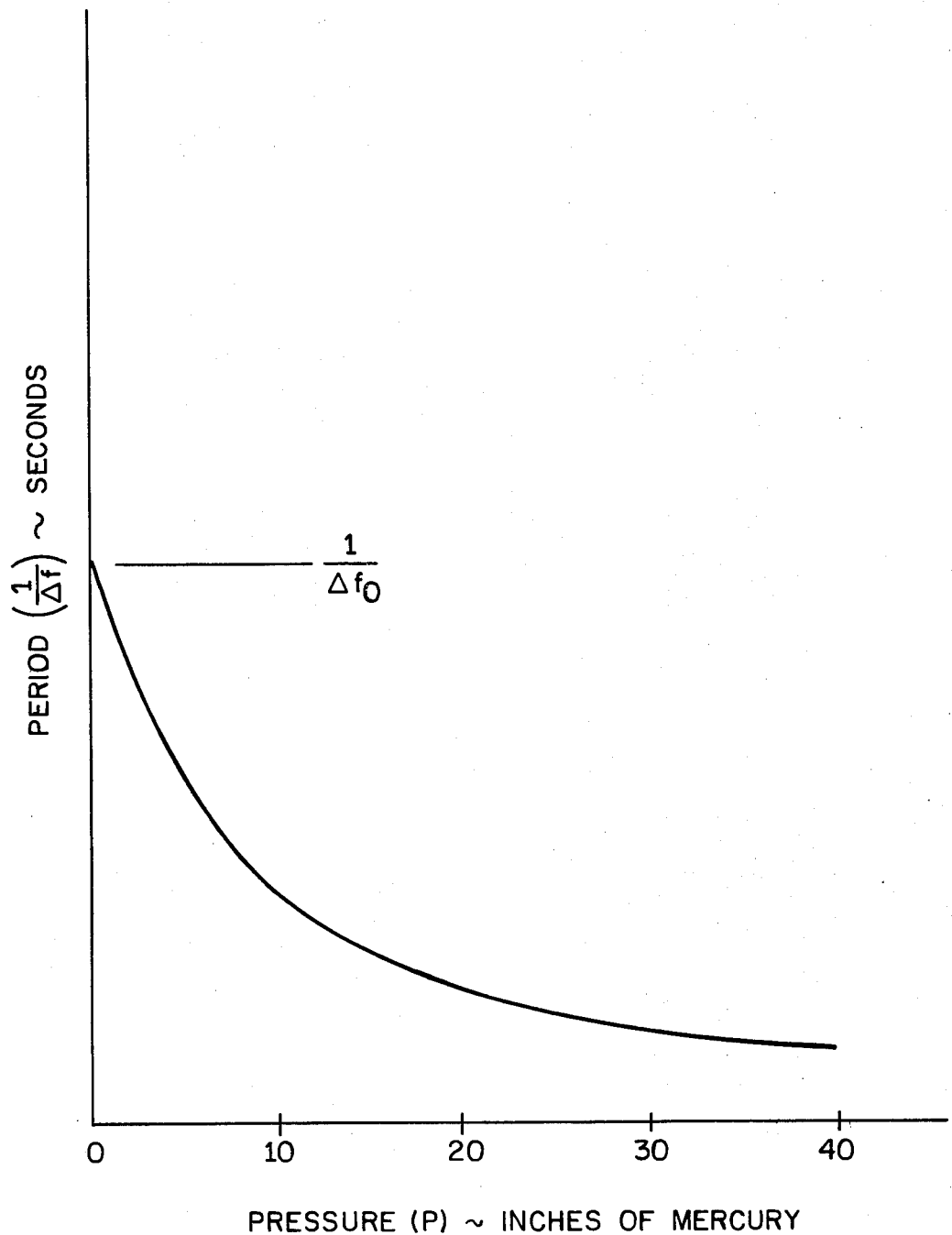
FIG. 3 is a plot of the inverse of the differential frequency as a function of pressure load.

FIG. 3 is plotted with K equal to unity for a pressure range of 40 in Hg. This function shape is particularly useful in airborne air data computer applications since the function slope and resolution increase at low pressures providing a sensitivity and resolution which quite closely approximates a constant altitude sensitivity and resolution. Where a more linear function of pressure is desired, $\Delta f_O$ can be increased in the sensor manufacture. This frequency difference between the two oscillators at zero applied pressure can be readily varied and trimmed in the manufacturing process using standard crystal oscillator industry techniques. This is a powerful design and calibration capability of the present invention.

Figure 4:
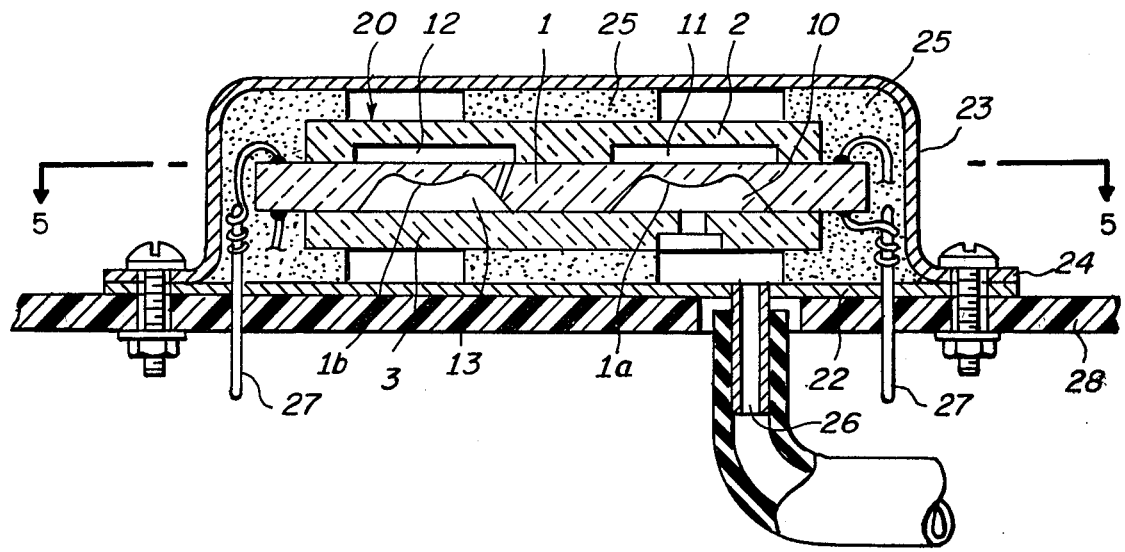
FIG. 4 is a longitudinal cross-sectional view of the entire pressure transducer assembly taken along section line 4—4 of FIG. 5.

FIGS. 4 and 5 illustrate the pressure transducer 20 as assembled in a housing with its required electrical and pneumatic connections and environmental protection. This assembly is particularly suitable for mounting on a conventional printed circuit board 28. The housing consists of a preferably sheet metal base 22 and a similar sheet metal cover 23 hermetically pressure sealed at their joining edges 24. The quartz transducer assembly 20 is preferably suspended within the housing by three resilient supports 25 such as suitably molded foam rubber or the like. The pressure to be measured is applied through a tube 26 which is soldered to or otherwise integral with the housing. Note that the entire housing volume is exposed to the pressure to be measured thereby avoiding any rigid connections between the transducer 20 and the tube 26. Electrical connections are made from the external tabs connected to the electrodes 6, 7, 8 and 9 to individual feedthrough terminals 27 which in turn are connected to their corresponding oscillators 14 and 15 using conventional printed wiring board techniques.

The structure and operation of the differential pressure transducer 20' (FIG. 2) is substantially identical to that of the absolute pressure sensor just described. The principal difference is simply that the pressure load on diaphragm 1' is the result of the difference of two variable pressures. In the air data computer applications, these two pressures are conventionally derived from the aircraft pitot tube. The higher pressure $P_{TOTAL}$ is applied to cavity 10' of the pressure transducer, and $P_{STATIC}$ is applied to the ported cavity 11'. The differential pressure is defined as $$Q_C = P_{TOTAL} - P_{STATIC}$$

It will of course be understood that the upper and lower portions of the transducer housing 23,24 must be hermetically isolated from one another.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A vibrating diaphragm pressure sensor comprising a first plate,
a diaphragm having a predetermined thickness between a first and second wall formed in said first plate, electrode means coupled with diaphragms for piezoelectrically exciting thickness shear mode oscillations substantially normal to said diaphragm, means for exposing at least one surface of said diaphragm to a variable pressure in a direction normal to said diaphragm for varying the frequency of said oscillations, and means responsive to said variable oscillation frequency for providing a measure of said variable pressure.

2. The pressure sensor as set forth in claim 1 wherein said plate comprises crystalline quartz.

3. The pressure sensor as set forth in claim 2 further comprising a second plate bonded to said first plate, said first plate having a first cavity formed therein wherein said first wall of said diaphragm is adjacent to said first cavity, and said exposing means comprises an opening in said second plate for admitting said variable pressure to said cavity.

4. The pressure sensor as set forth in claim 3 wherein said second plate comprises crystalline quartz having a predetermined crystal axis corresponding to that of said first plate and wherein said second plate is bonded to said first plate such that their axes are parallel.

5. The pressure sensor as set forth in claim 4 further comprising a third plate bonded to said first plate on a side opposite to said second plate, said third plate having a second cavity formed therein adjacent to said second wall of said diaphragm, said second cavity being subjected to a second fluid pressure.

6. The pressure sensor as set forth in claim 5 wherein said third plate comprises crystalline quartz having a predetermined crystal axis corresponding to those of said first and second plates and wherein all of said axes are mutually parallel.

7. The pressure sensor as set forth in claim 1 wherein said diaphragm is circular and wherein said predetermined thickness is maximum at the center thereof and reduces to a minimum in the direction of its periphery to suppress said thickness shear mode oscillations at said diaphragm periphery.

8. The pressure sensor as set forth in claim 1 further comprising oscillator means connected with said electrode means for exciting and sustaining said diaphragm oscillation at the natural vibration frequency thereof.

9. The pressure sensor as set forth in claim 1 further comprising a further diaphragm having a predetermined thickness also formed in said first plate, further electrode means coupled with said further diaphragm for piezoelectrically exciting thickness shear mode oscillations of said further diaphragm, and means for exposing said further diaphragm to a constant pressure for maintaining therein frequency of said oscillations therein constant, and means responsive to said variable and constant oscillation frequencies for providing a measure of said variable pressure.

10. The pressure sensor set forth in claim 9 wherein predetermined thicknesses of said diaphragm and further diaphragm are substantially identical.

11. The pressure sensor as set forth in claim 9 further comprising a second plate bonded to said first plate, said first plate having first and second cavities formed therein wherein said first wall of said diaphragm and said further diaphragm is adjacent to said first and second cavity respectively, and said exposing means comprises a first opening in said second plate for admitting said variable pressure to said first cavity and for sealing said constant pressure within said second cavity.

12. The pressure sensor as set forth in claim 11 wherein said second plate comprises crystalline quartz having a predetermined crystal axis corresponding to that of said first plate and wherein said second plate is bonded to said first plate such that their axes are parallel.

13. The pressure sensor as set forth in claim 11 wherein said thickness shear mode oscillations of said further diaphragm is predominantly normal to said predetermined thickness, and wherein said exposing means applies said constant pressure in a direction normal to said further diaphragm.

14. The pressure sensor as set forth in claim 11 further comprising a third plate bonded to said first plate opposite said second plate, said third plate having third and fourth cavities formed therein adjacent to said second wall of said diaphragm and further diaphragm respectively, said third cavity being subjected to a second fluid pressure and said fourth cavity being exposed to said constant pressure.

15. The pressure sensor as set forth in claim 14 wherein said third plate comprises crystalline quartz having a predetermined crystal axis corresponding to those of said first and second plates and wherein said third plate is bonded to said first plate such that their crystal axes are all mutually parallel.

16. The pressure sensor set forth in claim 9 wherein both of said diaphragms are circular and wherein said predetermined thicknesses is maximum at their centers and reduces to a minimum in the direction of their peripheries to suppress said thickness shear mode oscillations at said diaphragm peripheries.

17. The pressure sensor as set forth in claim 9 further comprising first and second oscillator means connected with said electrode means for exciting and sustaining said oscillations of said diaphragm and said further diaphragm at their natural vibration frequencies respectively.

18. The pressure sensor as set forth in claim 17 further comprising means responsive to said first and second oscillator means for providing an output responsive to the difference between their respective oscillation frequencies.

19. The pressure sensor as set forth in claim 14 further comprising an passage connecting said second and fourth cavities whereby both sides of said further diaphragm is subjected to said constant pressure.

20. A vibrating diaphragm pressure sensor comprising a sandwich of first, second and third plates fabricated from crystalline quartz, each plate having a predetermined crystal axis and said plates being bonded together with their respective crystal axes parallel, first and second cavities formed between said first and second plates defining first and second diaphragms of predetermined thicknesses, said diaphragms being circular and having a maximum thickness at the center thereof reducing to a minimum thickness at the periphery, third and fourth cavities formed between said first and second diaphragms and said third plate, an opening in said second plate for exposing said first cavity to fluid pressure to be measured, a second fluid pressure within said third cavity, a reference fluid pressure within said second and fourth cavities, first and second electrode means coupled with said first and second diaphragms respectively for piezoelectrically exciting shear mode oscillations of said diaphragms, first and second oscillator means connected with said first and second electrode means for exciting and sustaining said oscillations of said first and second diaphragms at their natural frequency of oscillations, and means responsive to said first and second oscillators for providing an output proportional to the difference between their respective oscillation frequencies.

21. The pressure sensor as set forth in claim 20 further comprising
a hermetically sealed housing for said quartz plate sandwich, and
tube means sealed to said housing for admitting said pressure to be measured to the interior of said housing.

22. The pressure sensor as set forth in claim 21 further comprising
resilient support means for resiliently supporting said quartz plate sandwich within said housing.

23. The pressure sensor as set forth in claim 20 wherein said fluid pressure to be measured is one of pitot static and pitot total pressure, and wherein said sensor further comprises
an opening in said third plate for exposing said third cavity to the other of said pitot static and pitot total pressures.

24. The pressure sensor as set forth in claim 23 further comprising
an passage connected between said second and fourth cavities for communicating said reference pressure to both sides of said second diaphragm.

* * * * *